United States Patent
Yokoyama (10) Patent No.: US 7,937,000 B2
(45) Date of Patent: May 3, 2011

(54) OPTICAL RECEIVER AND OPTICAL TRANSCEIVER USING THE SAME

(75) Inventor: Yoshitaka Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 630 days.

(21) Appl. No.: 12/056,930

(22) Filed: Mar. 27, 2008

(65) Prior Publication Data

US 2008/0240725 A1 Oct. 2, 2008

(30) Foreign Application Priority Data

Mar. 27, 2007 (JP) ................................ 2007-081661

(51) Int. Cl.
*H04B 10/06* (2006.01)

(52) U.S. Cl. ........................................ 398/213; 398/212

(58) Field of Classification Search ........... 398/212–213
See application file for complete search history.

(56) References Cited

U.S. PATENT DOCUMENTS 7,092,641 B2 * 8/2006 Windover ..................... 398/186
7,639,955 B2 * 12/2009 Zheng et al. .................. 398/212

FOREIGN PATENT DOCUMENTS

| JP | 03009624 A | 1/1991 |
| JP | 06265832 A | 9/1994 |
| JP | 07038503 A | 2/1995 |
| JP | 2004343360 A | 12/2004 |

* cited by examiner

*Primary Examiner* — Leslie Pascal (57) ABSTRACT

A small, low cost, low power-consumption optical receiver transmits signals at a high bit rate of approximately 10 Gbps over a long distance of 100 km or longer without chromatic dispersion compensation. An optical filter with a variable filtering wavelength is provided in the optical waveguide. A frequency-modulated signal light is inputted into the waveguide and transferred to the through port and the drop port thereof. The filter limits the frequency-modulated signal light to a predetermined frequency band and converts the said light to an intensity-modulated signal. The first and second converters provided at the through and drop ports to convert the first and second components of the intensity-modulated signal to electric signals, respectively. The filtering wavelength of the filter is controlled using the electric signals from the first and second converters. The input signal is regenerated from the electric signal of the second converter.

8 Claims, 6 Drawing Sheets

OPTICAL RECEIVER AND OPTICAL TRANSCEIVER USING THE SAME

This application is based upon and claims the benefit of priority from Japanese patent application No. 2007-081661 filed on Mar. 27, 2007, the disclosure of which is incorporated herein in its entirety by reference.

BACKGROUND OF THE INVENTION

1. Field of the Invention

The present invention relates to an optical receiver and an optical transceiver and more particularly, to an optical receiver and an optical transceiver that are useable for transmission of optical signals at a high bit rate over a long distance without chromatic dispersion compensation. The present invention is applicable to optical transceiver modules used for optical transmission systems, network systems, and so on.

2. Description of the Related Art

In recent years, a variety of small-sized optical transmitters has been developed according to the advance of the optical transmission technologies. With these small-sized optical transmitters, there is a major trend to realize higher-speed and longer-distance transmission with technological innovation. At present, a small-sized optical transmitter capable of optical transmission at a bit rate of, for example, 10 Gbps (gigabit per second), over a distance of approximately 80 km using single-mode optical fibers has been developed. However, according to the increase of the bit rate, optical transmission using the ordinary NRZ (Non Return to Zero) modulation method has already reached the transmission limit caused by chromatic dispersion.

Accordingly, a variety of new modulation methods has been developed to overcome such the transmission limit as above so far; however, they have disadvantages. For example, with the Duo Binary modulation method, there is a disadvantage about the size, power consumption, and cost of the optical transmitter. On the other hand, with the Chirp Managed Laser (CML) method, the disadvantage about the size, power consumption, and cost of the optical transmitter has been improved to a certain extent; however, the size and cost of the transmitter need to be lowered furthermore.

The conventional optical transceivers have the following two problems.

The first problem is that the long distance transmission capability (concretely speaking, chromatic dispersion tolerance) is insufficient and therefore, it is difficult to transmit signals at a high bit rate of approximately 10 Gbps over a distance of 100 km or longer without chromatic dispersion compensation. This problem is caused by the following.

Specifically, it is general that the bandwidth of the modulation spectrum of light spreads according to the increase of the bit rate and therefore, the light propagating in the optical fiber transmission lines is more likely to be affected by chromatic dispersion. As a result, the waveform degradation of the light will be prominent, which means that the long distance transmission is limited.

The second problem is that if we seek to solve the above-described first problem about the long distance transmission capability, the size of the optical transceiver becomes large and the power consumption thereof is increased. The cause of this problem is as follows:

If we seek to carry out one of the above-described newly-developed modulation methods in order to reduce the bandwidth of the modulation spectrum of light, the circuit structure of the transmission section is complicated. For this reason, the size of the optical transceiver is enlarged and as a result, large modulation power is required.

Accordingly, to solve the above-described two problems simultaneously, there is the need for an optical transceiver that is capable of signal transmission at a high bit rate of approximately 10 Gbps over a distance of 100 km or longer without chromatic dispersion compensation and that is small in size and low in power consumption.

Next, other related art of the present invention will be explained below.

The Patent Document 1 (the Japanese Non-Examined Patent Publication No. 2004-343360) published in 2002 discloses an optical communication device and an optical communication system for wavelength multiplexing optical communication systems, which enhance the utilization efficiency of the frequency of light easily.

With the optical communication device disclosed by the Patent Document 1, a pair of differential Non return to Zero Inverted (NRZI) signals, which have been cut-off in a wide range, is respectively applied to two branch paths of a push-pull type optical intensity modulator. The amplitude levels of the pair of differential NRZI signals and the DC bias level of the optical intensity modulator are set appropriately. In this way, an inverted Return to Zero (RZ) signal of light whose phases of respective adjoining marks are reversed is generated. Moreover, the bandwidth of the inverted RZ signal of light thus generated is limited by an optical filter to thereby suppress the spectrum width of the said RZ signal. (See Abstract, FIGS. 1 to 4, and paragraphs 0015 to 0031 of the Patent Document 1.)

The Patent Document 2 (the Japanese Non-Examined Patent Publication No. 3-9624) published in 1991 discloses a modulating/demodulating method for an optical communication system, where an optical signal is frequency-modulated at a light source and transmitted on the transmission side, and the said optical signal is subjected to a frequency-amplitude conversion and thereafter, detected on the reception side.

With the modulating/demodulating method for an optical communication system disclosed by the Patent Document 2, the signal light is frequency-modulated by the semiconductor laser of the transmitter, and is transmitted toward the reception side by way of optical fibers and optical repeaters, where the signal light is amplified by optical amplifiers during transmission. On the reception side, for example, the signal light is divided into two parts and then, a phase difference of $\pi$ is applied to these two parts and combined again, resulting in an amplitude-modulated signal light. Alternately, at the end of the reception side, the frequency-modulated signal light is converted to an amplitude-modulated signal light by appropriate frequency-amplitude converting means (e.g., frequency-amplitude conversion using a Fabry-Perot interferometer) in advance. Subsequently, the amplitude-modulated signal light is directly detected by an optical receiver (e.g., photodiodes). In this way, the amplitude of the signal light received is kept constant. As a result, the waveform distortion of the signal light in the saturation region can be avoided.

In addition, since the spectrum width of the signal light is restricted, the effect of chromatic dispersion of the optical fibers can be decreased. (See claims, FIGS. 1 and 2, "action" section in lower right column of page 2, "advantage" section in lower left column of page 3 of the Patent Document 2.)

The Patent Document 3 (the Japanese Non-Examined Patent Publication No. 6-265832) published in 1994 discloses a tunable optical filter device that makes it possible to convert a frequency-modulated signal light to an intensity-modulated one stably at high efficiency.

With the tunable optical filter device disclosed by the Patent Document 3, an inputted frequency-modulated signal light is converted to an intensity-modulated signal light by an optical filter element having a wavelength transmission characteristic where the central transmission wavelength is variable. The intensity-modulated signal light thus obtained is converted to an electric signal by way of an optical detector and an amplifier. From the output of the amplifier (i.e., the electric signal), the intensity amplitude of the intensity-modulated signal light is detected using a detector. Thereafter, the intensity amplitude signal obtained from the detector is inputted into a CPU (Central Processing Unit), thereby controlling the wavelength transmission characteristic of the above-described optical filter element by a rotation-angle detecting mechanism and a temperature adjuster in such a way that the conversion efficiency from the frequency-modulated signal to the intensity-modulated one is maximized. The above-described optical filter element is a narrow-band tunable filter having a single peak, which may be formed by a Fabry-Perot resonator. (See Abstract, FIGS. 1 and 2, and paragraphs 0016 to 0019 of the Patent Document 3.)

The Patent Document 4 (the Japanese Non-Examined Patent Publication No. 7-38503) published in 1995 discloses a frequency-modulated signal transmission device (FM transmission device), where the demodulation efficiency deterioration is prevented even if the central frequency of a frequency-modulated signal is fluctuated during the demodulation process thereof.

With the FM transmission device disclosed by the Patent Document 4, the subcarrier is modulated by a data signal according to the amplitude shift keying. Moreover, using the said modulated signal according to the amplitude shift keying, the carrier for an optical or electrical signal is frequency-modulated and transmitted. On the reception side, after the reception, the frequency-modulated signal is converted to an amplitude-modulated signal by a self-delaying interferometer and thereafter, the envelope component of the said amplitude-modulated signal is extracted by envelope detecting means. Moreover, the fundamental of a predetermined angular frequency and its secondary harmonics are extracted using a band-pass filter and then, they are envelope-detected. Finally, these signals obtained by the envelope detection are respectively squared by squaring circuits and added to each other. In this way, the data signal is demodulated. (See FIGS. 1 to 4, and paragraphs 0015, 0019 to 0029 of the Patent Document 4.)

SUMMARY OF THE INVENTION

The present invention was created to fulfill the above-described need for an optical transceiver using a different structure from the prior-art techniques disclosed by the Patent Documents 1 to 4.

An object of the present invention is to provide an optical receiver and an optical transceiver that make it possible to transmit signals at a high bit rate of, for example, approximately 10 Gbps, over a long distance (e.g., 100 km or longer) without chromatic dispersion compensation and that are small in size, low in cost, and low in power consumption.

Another object of the present invention is to provide an optical receiver and an optical transceiver that have a simple structure and that can be operated stably.

The above objects together with others not specifically mentioned will become clear to those skilled in the art from the following description.

According to a first aspect of the present invention, an optical receiver for receiving a frequency-modulated signal light generated by frequency-modulating an input signal is provided. This optical receiver comprises:

an optical filter for limiting the frequency-modulated signal light to a predetermined frequency band and for converting the frequency-modulated signal light to an intensity-modulated signal light;

the optical filter having a variable filtering wavelength;

an optical waveguide having an input port, a first output port, and a second output port;

the optical waveguide receiving the frequency-modulated signal light at the input port and transmitting the frequency-modulated signal light thus received toward the first output port and the second output port by way of the optical filter;

a first photoelectric converter, provided at the first output port of the optical waveguide, for converting the frequency-modulated signal light or a first component of the intensity-modulated signal light to an electric signal;

a second photoelectric converter, provided at the second output port of the optical waveguide, for converting a second component of the intensity-modulated signal light to an electric signal; and a controller for controlling the filtering wavelength of the optical filter based on the electric signal outputted from the first photoelectric converter and the electric signal outputted from the second photoelectric converter;

wherein the input signal is regenerated based on the electric signal outputted from the second photoelectric converter.

With the optical receiver according to the first aspect of the present invention, when the frequency-modulated signal light, which has been inputted into the optical waveguide at the input port thereof, is transferred toward the first output port and the second output port of the waveguide, the said frequency-modulated signal light is filtered by the optical filter. Due to this filtering, the frequency-modulated signal light is converted to the intensity-modulated signal light in the waveguide.

Therefore, the frequency-modulated signal light or the first component of the intensity-modulated signal light is transferred to the first output port of the waveguide. The second component of the intensity-modulated signal light is transferred to the second output port of the waveguide. At this time, the second component of the intensity-modulated signal light has been limited to the predetermined frequency band by the filter. The first component of the intensity-modulated signal light contains frequency components excluding the predetermined frequency band to be limited by the filter.

Moreover, the frequency-modulated signal light or the first component of the intensity-modulated signal light is converted to the electric signal by the first photoelectric converter provided at the first output port of the waveguide. The second component of the intensity-modulated signal light is converted to the electric signal by the second photoelectric converter provided at the second output port of the waveguide. These two electric signals generated and outputted respectively from the first and second photoelectric converters are sent to the controller and used for controlling the filtering wavelength of the filter. The input signal is regenerated based on the electric signal outputted from the second photoelectric converter.

In this way, with the optical receiver according to the first aspect of the invention, the frequency band of the frequency-modulated signal light is limited and the frequency-modulated signal light is converted to the intensity-modulated signal light by filtering using the above-described optical filter, and thereafter, the input signal is regenerated. Accordingly, the input signal can be transmitted at a high bit rate of approximately 10 Gbps over a long distance of 100 km or longer without chromatic dispersion compensation.

Moreover, the controller controls the filtering wavelength of the optical filter in such a way as to be optimized for the frequency-modulated signal light, based on the electric signal outputted from the first photoelectric converter provided at the first output port and the electric signal outputted from the second photoelectric converter provided at the second output port. Therefore, the filter (and therefore, the said optical receiver) can be operated stably. In addition, the controller can be realized using a simple structure that is equivalent to that of a popular temperature controller circuit.

Furthermore, since the optical waveguide, the optical filter, and the first and second photoelectric converters can be easily integrated on an optical waveguide substrate, the said optical receiver can be made small in size, low in cost, and low in power consumption.

As the above-described optical filter, an optical filter having any structure may be used if it has a function of selecting desired light of a specific frequency (wavelength) range and it can be used in combination with the above-described optical waveguide. For example, a ring resonator filter may be used for this purpose.

In a preferred embodiment of the optical receiver according to the first aspect of the invention, the first component is the intensity-modulated signal light whose frequency is outside the predetermined frequency band limited by the filter, and the second component is the intensity-modulated signal light whose frequency is in the predetermined frequency band limited by the filter. In this embodiment, if, for example, a ring resonator filter is used as the optical filter and then, the first output port of the optical waveguide is assigned to the through port of the said filter, and the second output port of the said waveguide is assigned to the drop port thereof, there is an additional advantage that the said optical receiver can be realized more easily.

In another preferred embodiment of the optical receiver according to the first aspect of the invention, the first component is the frequency-modulated signal light that does not pass through the optical filter, and the second component is the intensity-modulated signal light whose frequency is in the predetermined frequency band limited by the filter. In this embodiment, the first output port of the waveguide is assigned to the power monitor port of the filter, and the second output port of the said waveguide is assigned to the drop port of the filter. Since the first component of the intensity-modulated signal light generated by photoelectric conversion of the frequency-modulated signal light does not depend on the wavelength, there is an additional advantage that the operation or calculation required for the controller is simplified.

In still another preferred embodiment of the optical receiver according to the first aspect of the invention, a temperature adjuster for adjusting a temperature of the filter is additionally provided, wherein the controller is configured in such a way as to control the filtering wavelength of the filter using the temperature adjuster. In this embodiment, there is an additional advantage that the filtering wavelength of the filter can be controlled easily. A heater, a Peltier element, or the like may be used as the temperature adjuster.

In a further preferred embodiment of the optical receiver according to the first aspect of the invention, an optical amplifier is additionally provided in the waveguide. In this embodiment, there is an additional advantage that the reception characteristics are stabilized, because the frequency-modulated signal light is amplified by the optical amplifier and thereafter, is transmitted toward the first and second output ports.

Any type of optical amplifier, such as a semiconductor optical amplifier, an optical waveguide amplifier, or the like, may be used as the optical amplifier.

In a still further preferred embodiment of the optical receiver according to the first aspect of the invention, the electric signal outputted from the first photoelectric converter and the electric signal outputted from the second photoelectric converter vary dependent on a difference $\Delta\lambda$ between a central frequency of the filter and a central frequency of the frequency-modulated signal light, respectively. In this embodiment, there is an additional advantage that the said optical receiver can be operated stable by controlling the temperature of the filter in such a way that the difference $\Delta\lambda$ has an optimum value.

According to a second aspect of the present invention, an optical transceiver is provided, which comprises:

the optical receiver according to the first aspect of the invention as an optical reception section; and an optical transmission section where the frequency-modulated signal light is generated and transmitted.

The optical transceiver according to the second aspect of the present invention has a structure obtained by combining the optical receiver according to the first aspect of the invention serving as the optical reception section with the above-described optical transmission section. Therefore, it is apparent that the same advantages as those of the optical receiver according to the first aspect are obtained.

In a preferred embodiment of the optical transceiver according to the second aspect of the invention, the optical transmission section comprises a semiconductor laser, and the frequency-modulated signal light is generated by direct-modulating the laser. In this embodiment, since an external modulator for the semiconductor laser is unnecessary, there is an additional advantage that the structure of the said optical transceiver is simplified and power consumption thereof is lowered.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Preferred embodiments of the present invention will be described in detail below while referring to the drawings attached.

First Embodiment

Figure 1:
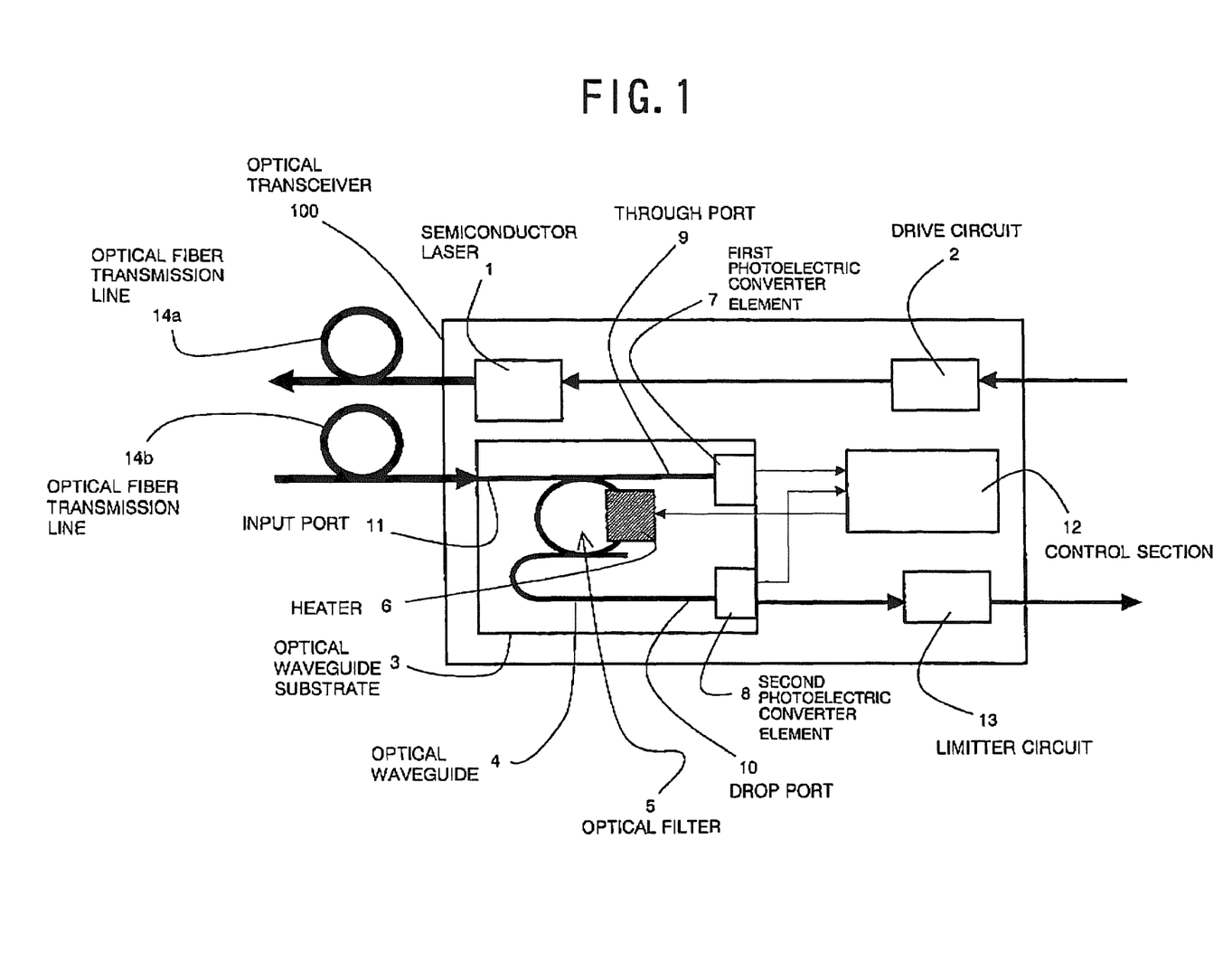
FIG. 1 is a functional block diagram showing the structure of an optical transceiver according to a first embodiment of the present invention.

The whole structure of an optical transceiver 100 according to a first embodiment of the present invention is shown in FIG. 1.

As shown in FIG. 1, the optical transceiver 100 according to the first embodiment comprises a semiconductor laser 1 as a light source; a drive circuit 2 for driving the semiconductor laser 1; an optical waveguide substrate 3 on which an optical waveguide 4, an optical filter 5, a heater 6, a first photoelectric converter element 7, and a second photoelectric converter element 8 are mounted; a control section 12 for controlling the operation of the optical filter 5 based on the output signals of the first and second photoelectric converter elements 7 and 8; and a limiter circuit 13 for limiting the amplitude of the output signal of the second photoelectric converter element 8. The filter 5 is a band-path filter that allows selectively optical signals whose frequencies are in a predetermined frequency range to pass through the said filter. Here, a ring oscillator is used as the filter 5. As the first and second photoelectric converter elements 7 and 8, for example, photodiodes are used, respectively. The control section 12 may be formed by any electronic circuit.

The semiconductor laser 1 and the drive circuit 2 constitute the optical transmission section of the optical transceiver 100. The optical waveguide substrate 3 (on which the optical waveguide 4, the optical filter 5, the heater 6, and the first and second photoelectric converter elements 7 and 8 are mounted), the control section 12, and the limiter circuit 13 constitute the optical reception section (which may be termed the optical receiver) of the optical transceiver 100.

The drive circuit 2 of the transmission section modulates the bias current for the semiconductor laser 1 as the light source under an appropriate condition in response to the electric signal inputted from the outside, thereby Frequency-Modulating (FM) the output light of the laser 1 using the direct modulating method. The temperature control of the laser 1 is not essential; however, it is preferred to control the temperature of the laser 1 in such a way that the temperature of the vicinity of the laser 1 is kept constant One end of an optical fiber transmission line 14a, which is mounted outside the transceiver 100, is connected to the output end of the laser 1. The output light of the laser 1 (i.e., the frequency-modulated signal light) is sent to the optical fiber transmission line 14a by way of an optical isolator, an optical lens system, and so on (which are not shown) according to the necessity. The frequency-modulated signal light thus sent out is transmitted to the outside by way of the transmission line 14a.

The optical reception section comprises the optical waveguide substrate 3 in which the optical waveguide 4 is formed. The optical filter 5 (here, ring resonator filter) is formed on the way of the waveguide 4. The waveguide 4 has an input port 11 to which an optical signal is inputted, a through port 9 which corresponds to the notch filter output of the filter 5, and a drop port 10 which corresponds to the band-path filter output of the filter 5. The first photoelectric converter element 7 is connected to the through port 9. The second photoelectric converter element 8 is connected to the drop port 10. The wavelength of the filter 5 can be controlled using the heater 6 mounted on the filter 5.

One end of an optical fiber transmission line 14b, which is mounted outside the transceiver 100, is connected to the input port 11 of the waveguide 4. The frequency-modulated signal light, which has been sent to the optical transceiver 100 by way of the optical fiber transmission line 14b, enters the waveguide 4 through the input port 11. The frequency-modulated signal light thus entered is sent to the optical filter 5 provided in the waveguide 4, where the frequency-modulated signal light is limited to the predetermined frequency band and the modulation type of the frequency-modulated signal light is converted to the Intensity Modulation (IM) from the frequency modulation by the filter 5. In this way, the frequency-modulated signal light is converted to the intensity-modulated signal light having the limited frequency band.

A part (which corresponds to the notch filter output, i.e., the component excluding the limited frequency band) of the intensity-modulated signal light having the limited frequency band generated in this way is inputted into the first photoelectric converter element 7 by way of the through port 9 of the waveguide 4 and then, converted to an electric signal. The output signal of the first photoelectric converter element 7, which is an electric signal corresponding to the average optical intensity of the component corresponding to the notch filter output of the intensity-modulated signal light, is sent to the control section 12.

On the other hand, another part (which corresponds to the band-pass filter output, i.e., the component including the limited frequency band) of the intensity-modulated signal light having the limited frequency band generated in this way is inputted into the second photoelectric converter element 8 by way of the drop port 10 of the waveguide 4 and then, converted to another electric signal. The output signal of the second photoelectric converter element 8, which is an electric signal corresponding to the average optical intensity of the component corresponding to the band-pass filter output of the intensity-modulated signal light, is sent to the control section 12 and the limiter circuit 13.

The electric signal inputted in the limiter circuit 13 is amplitude-limited by the limiter circuit 13 and then, is outputted to an electrical interface of the optical transceiver 100 provided on the reception side thereof, thereby regenerating the inputted electric signal.

The control section 12 receives the output signal of the first photoelectric converter element 7 and the output signal of the second photoelectric converter element 8. Then, the control section 12 controls the heater 6 for the filter 5 according to the average intensity of the inputted lights obtained from the two output signals, thereby carrying out the temperature adjustment operation of the filter 5. In addition, to control the entire optical transceiver 100, the control section 12 can exchange signals with the semiconductor laser 1, the drive circuit 2, and the limiter circuit 13 as necessary. The control section 12 having such the functions as above can be easily realized using a control circuit equivalent to an ordinarily used temperature control circuit.

Next, the operation of the optical transceiver 100 having the above-described structure will be explained below with reference to FIGS. 2 and 3.

Figure 2:
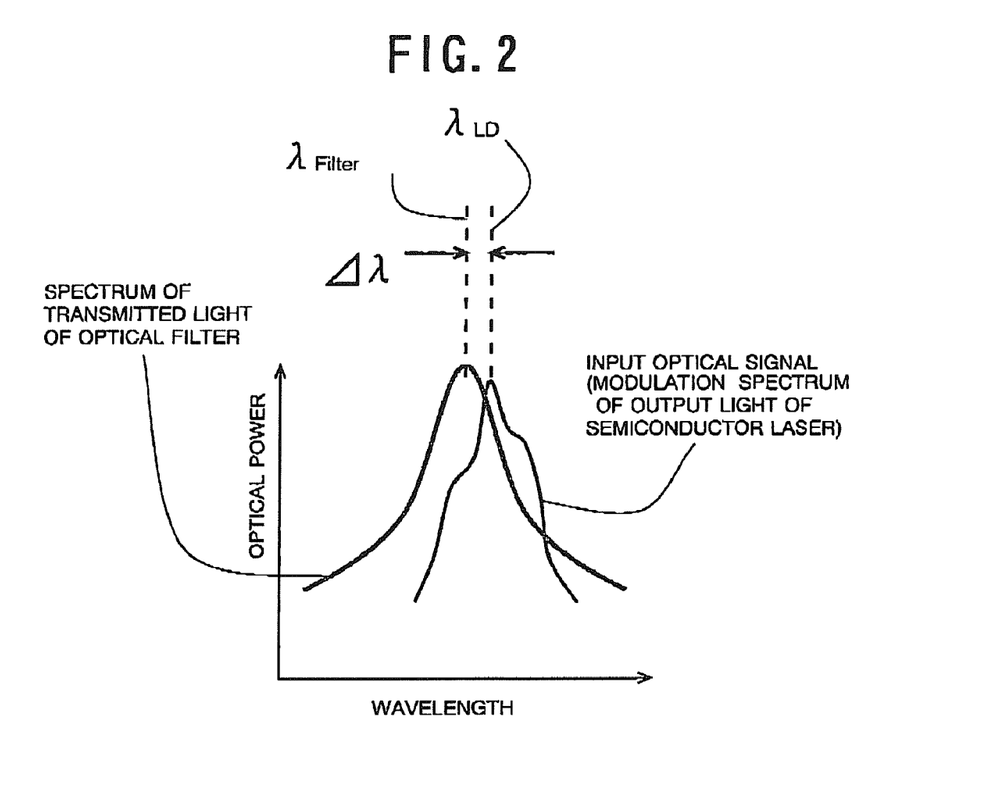
FIG. 2 is a graph showing the relationship between the spectrum of the frequency-modulated signal light inputted into the optical transceiver according to the first embodiment of the present invention and the transmission spectrum of the optical filter used therein.
Figure 3:
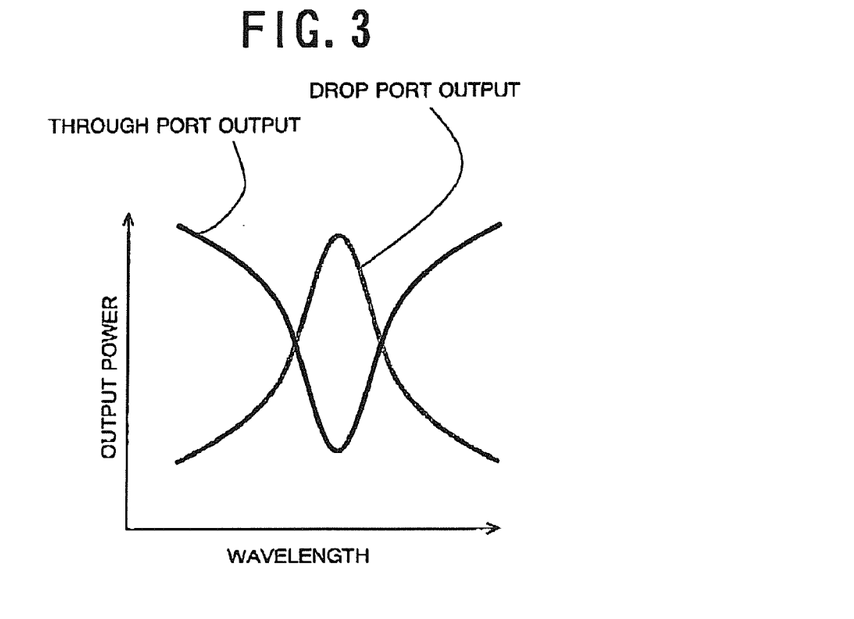
FIG. 3 is a graph showing the relationship between the characteristic of the intensity-modulated signal light inputted into the first photoelectric converter by way of the through port and that of the intensity-modulated signal light inputted into the second photoelectric converter by way of the drop port in the optical transceiver according to the first embodiment of the present invention.

As shown in FIG. 2, there is a shift between the oscillation wavelength $\lambda_{LD}$ of the semiconductor laser 1 (i.e., the wavelength of the transmitted signal light) and the central wavelength $\lambda_{FILTER}$ of the optical filter 5. Therefore, when the difference between these two wavelengths is defined as $\Delta\lambda$, both of the intensity-modulated signal lights the first and second photoelectric converter elements 7 and 8 respectively receive will vary dependent on the wavelength difference $\Delta\lambda$. Therefore, if these two intensity-modulated signal lights received respectively by the first and second photoelectric converter elements 7 and 8 are used as monitoring signals, the value of $\Delta\lambda$ can be obtained correctly after normalization with respect to the intensity of the inputted signal light. Accordingly, a stable light reception characteristic can be obtained by keeping the value of $\Delta\lambda$ constant through the control operation by the control section 12.

With the optical transceiver 100, it is necessary to stabilize the value of $\Delta\lambda$ with high accuracy. However, there is a possibility that the value of $\Delta\lambda$ has a slight deviation due to the ambient temperature change and/or the long-term operation. Therefore, it is necessary that the deviation is detected and fed-back to the control section 12. Such the control is realized by using the first and second photoelectric converter elements 7 and 8 and the heater 6 here.

Specifically, the first and second photoelectric converter elements 7 and 8 can detect respectively the average intensities of the inputted lights that vary dependent on the wavelengths of the inputted lights. If the average intensities of the inputted lights obtained by the first and second photoelectric converter elements 7 and 8 are defined as A and B, respectively, for example, the value of $(A-B)/(A+B)$ is equal to the wavelength change signal normalized with respect to the intensity of the inputted light, i.e., $\Delta\lambda$. If such the calculation operation as above is carried out by the control section 12, the value of $\Delta\lambda$ can be detected at all times. Thus, by controlling the heater 6 in such a way that $\Delta\lambda$ has an appropriate value according to the detected value of $\Delta\lambda$, the operation of the optical filter 5 can be stabilized with respect to the temperature change. Accordingly, stabilized optical filtering can be applied and as a result, stable reception characteristics with respect to the optical signals transmitted over a long distance can be obtained.

In addition, it is unknown what state of the polarized waves the inputted signal light is in. Therefore, ideally, it is desirable that the optical waveguide 4 (including the optical filter 5) does not have any polarized wave dependency. However, if the waveguide 4 has slight polarized wave dependency, the change of the state of polarized waves is approximately equivalent to the wavelength shift of the inputted signal light. Thus, in this case, the optical filter 5 can be stably operated using the above-described controlling method.

If the polarized wave dependency of the waveguide 4 is equal to a certain level or greater, it is preferred that a polarized wave controller or the like (not shown) is provided on the input side of the reception section of the transceiver 100. If so, the polarized wave of the inputted light is fixed by the polarized wave controller or the like and therefore, stable characteristics are obtained.

With the optical transceiver 100 according to the first embodiment of the invention, as explained above, when the frequency-modulated signal light, which has been inputted into the optical waveguide 4 at the input port 11 thereof, is transferred toward the through port 9 (the first output port) and the drop port 10 (the second output port) of the waveguide 4, the frequency-modulated signal light is filtered by the optical filter 5. Thus, the frequency-modulated signal light is converted to the intensity-modulated signal light in the waveguide 4. Therefore, the notch-filter output (i.e., the component excluding the limited frequency band) of the intensity-modulated signal light whose frequency band has been limited is transferred to the through port 9, and the band-pass filter output (i.e., the component including the limited frequency band) of the said signal light is transferred to the drop port 10.

Moreover, the notch-filter output (i.e., the first component) of the intensity-modulated signal light is converted to the electric signal by the first photoelectric converter element 7 provided at the through port 9 of the waveguide 4. The band-pass filter output (i.e., the second component) of the intensity-modulated signal light is converted to the electric signal by the second photoelectric converter element 8 provided at the drop port 10 of the waveguide 4. These two electric signals generated and outputted respectively from the first and second photoelectric converter elements 7 and 8 are sent to the control section 12 and used for controlling the filtering wavelength of the optical filter 5. The input signal is regenerated based on the electric signal outputted from the second photoelectric converter element 8 by way of the limiter circuit 13.

In this way, with the optical transceiver 100 according to the first embodiment of the invention, by the filtering operation using the above-described optical filter 5, the frequency band of the frequency-modulated signal light is limited and the frequency-modulated signal light is converted to the intensity-modulated signal light. Accordingly, the input signal light can be transmitted at a high bit rate of approximately 10 Gbps over a long distance of 100 km or longer without chromatic dispersion compensation using ordinary single-mode optical fibers of, for example, the wavelength band of 1550 nm. This is due to the following reason:

The signal light inputted from the optical fiber transmission line 14b was transmitted over a long distance and therefore, it is usual that the said signal light includes waveform deterioration due to the effect of chromatic dispersion. However, with the optical transceiver 100, the frequency band of the frequency-modulated signal light inputted is limited by the optical filter 5 and at the same time, it is converted to the intensity-modulated signal light. Therefore, the waveform deterioration of the said signal light is suppressed.

Moreover, the control section 12 controls the filtering wavelength of the optical filter 5 in such a way as to be optimized for the frequency-modulated signal light, based on the electric signal outputted from the first photoelectric converter element 7 provided at the through port 9 and the electric signal outputted from the second photoelectric converter element 8 provided at the drop port 10. Therefore, the filter 5 (and therefore, the optical transceiver 100) can be operated stably. In addition, the control section 12 can be realized using a simple structure equivalent to that of a popular temperature controller circuit.

Further, since the optical waveguide 4, the optical filter 5, and the first and second photoelectric converter elements 7 and 8 are integrated on the optical waveguide substrate 3, the optical transceiver 100 (i.e., the reception section thereof) can be made small in size, low in cost, and low in power consumption.

Furthermore, in the transmission section, the frequency-modulated signal light is generated by the semiconductor laser 1, where the laser 1 is modulated by the direct modulation method using the drive circuit 2. Therefore, a sufficient degree of frequency modulation is obtained with smaller amplitude of the driving current than that for ordinary intensity modulation. This means that power consumption required for operating the said transmission section can be suppressed at a low level.

Second Embodiment

Figure 4:
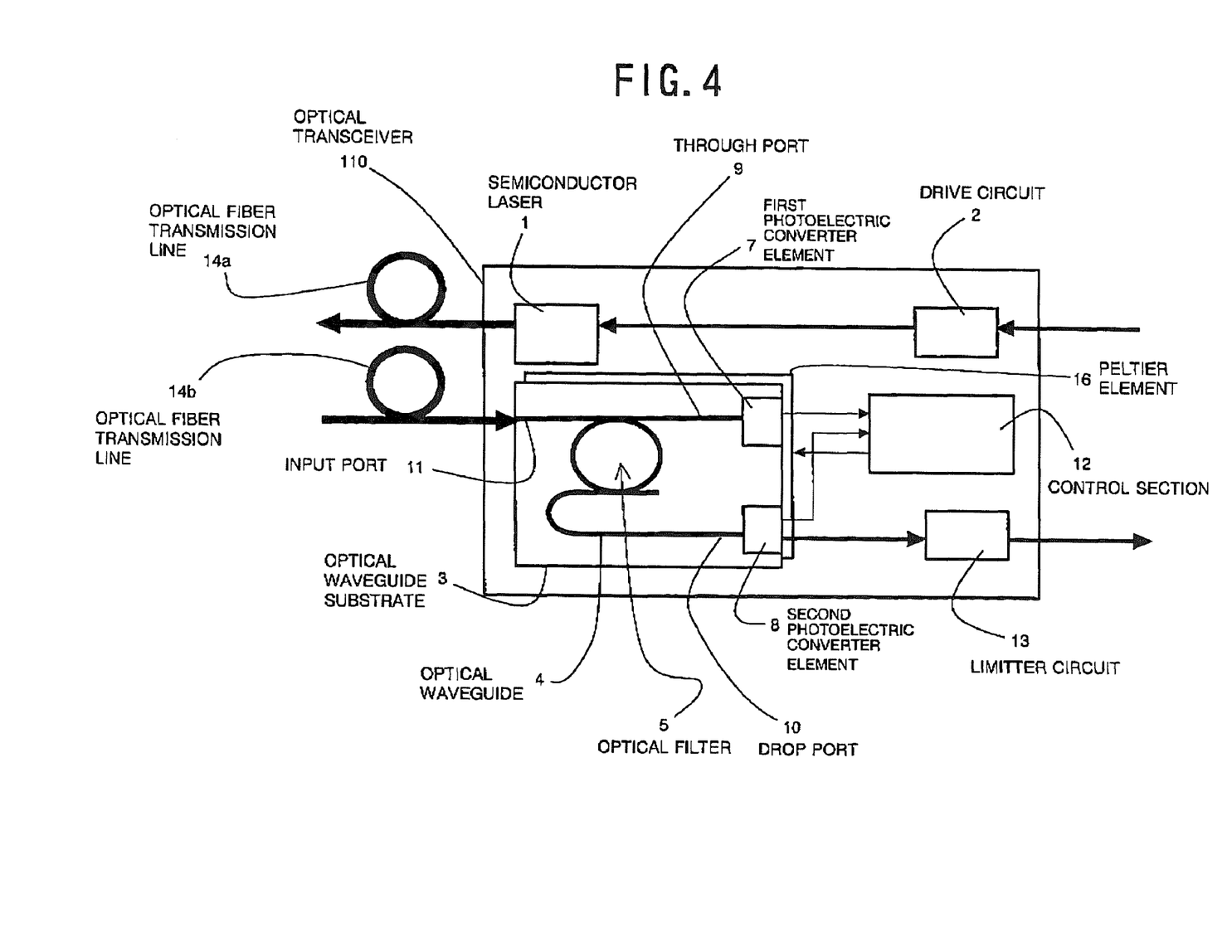
FIG. 4 is a functional block diagram showing the structure of an optical transceiver according to a second embodiment of the present invention.

FIG. 4 is a functional block diagram showing the structure of an optical transceiver 110 according to a second embodiment of the invention.

The optical transceiver 110 is the same in structure as the optical transceiver 100 according to the first embodiment of FIG. 1 except that the optical waveguide substrate 3 is entirely mounted on a Peltier element 16, which is provided instead of the heater 6 for the optical filter 5. Therefore, the explanation about the same structure is omitted here by attaching the same reference numerals as those used in the first embodiment for simplification.

With the optical transceiver 110 according to the second embodiment, due to the operation of the Peltier element 16, the temperature of the entire optical waveguide substrate 3 (including the optical filter 5) can be controlled by using the control section 12. Accordingly, similar to the transceiver 100 according to the first embodiment where the heater 6 is used, the wavelength of the filter 5 can be controlled. This means that the same advantages as those of the transceiver 100 of the first embodiment are obtained.

Third Embodiment

Figure 5:
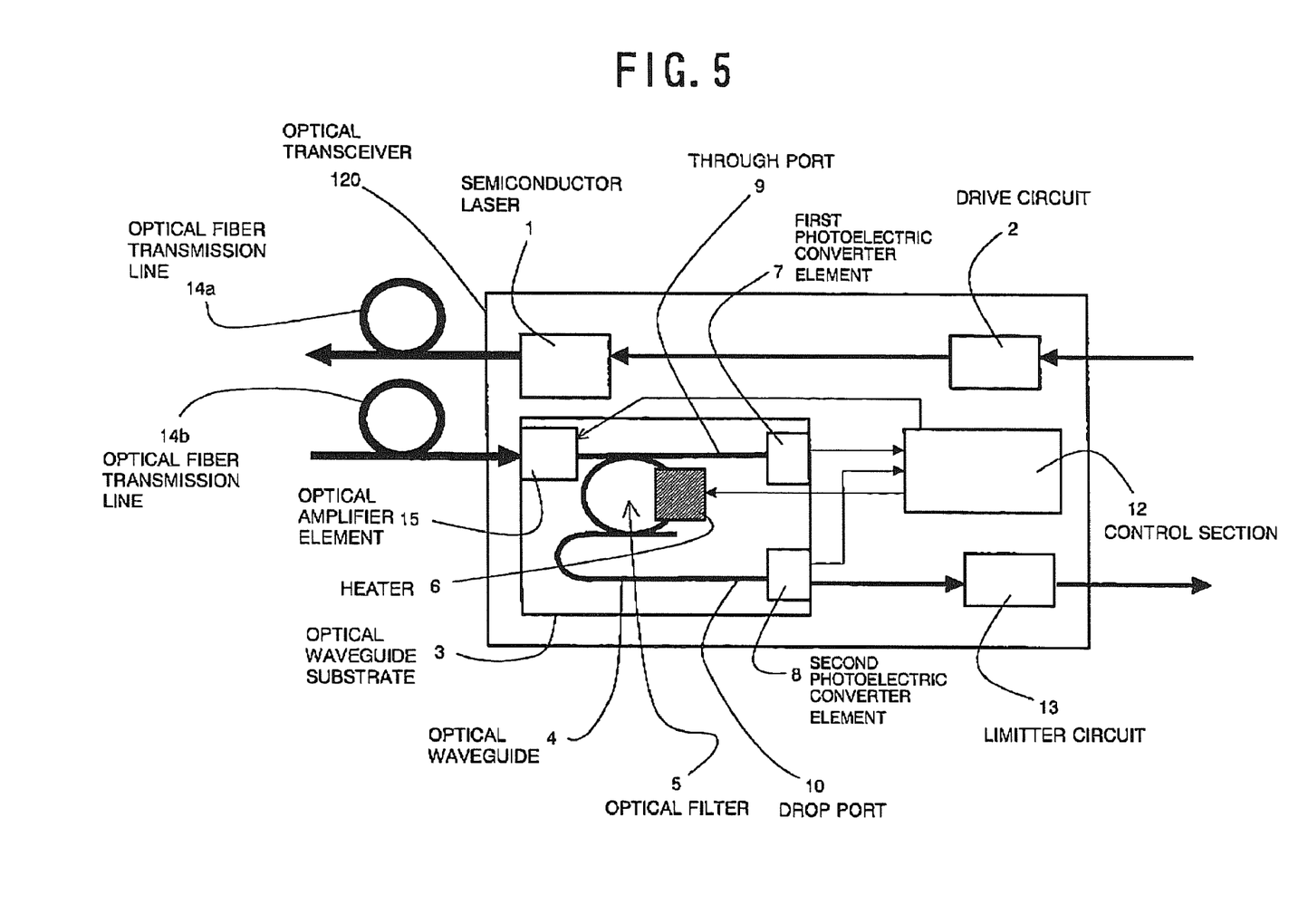
FIG. 5 is a functional block diagram showing the structure of an optical transceiver according to a third embodiment of the present invention.

FIG. 5 is a functional block diagram showing the structure of an optical transceiver 120 according to a third embodiment of the invention.

The optical transceiver 120 is the same in structure as the optical transceiver 100 according to the first embodiment of FIG. 1 except that an optical amplifier element 15 is additionally mounted at the input port 11 of the optical waveguide substrate 3. Therefore, the explanation about the same structure is omitted here by attaching the same reference numerals as those used in the first embodiment for simplification.

With the optical transceiver 120 according to the third embodiment, the inputted signal light having a low intensity can be transmitted to the filter 5 after amplifying its intensity by the optical amplifier element 15. Accordingly, in addition to the advantages of the transceiver 100 according to the first embodiment, there is an additional advantage that stable reception characteristics can be obtained.

The optical amplifier element 15 may be formed by a semiconductor optical amplifier, a waveguide-type optical amplifier, or a fiber-type optical amplifier.

Since the signal light that has passed through the optical amplifier element 15 contains noise components, a band-pass filter is required for removing these noise components. However, with the optical transceiver 120 of the third embodiment, the signal light is transmitted to the second photoelectric converter element 8 after passing through the filter 5. As a result, the noise components are automatically removed by the filter 5 and no problem occurs.

It is preferred that the optical amplifier element 15 is controlled in such a way that the inputted intensity of the received signal light to the optical waveguide 4 is constant. To realize this, the inputted intensity obtained from the calculation result by the control section 12 of the monitor port output may be used as a feedback signal to the amplifier element 15.

Fourth Embodiment

Figure 6:
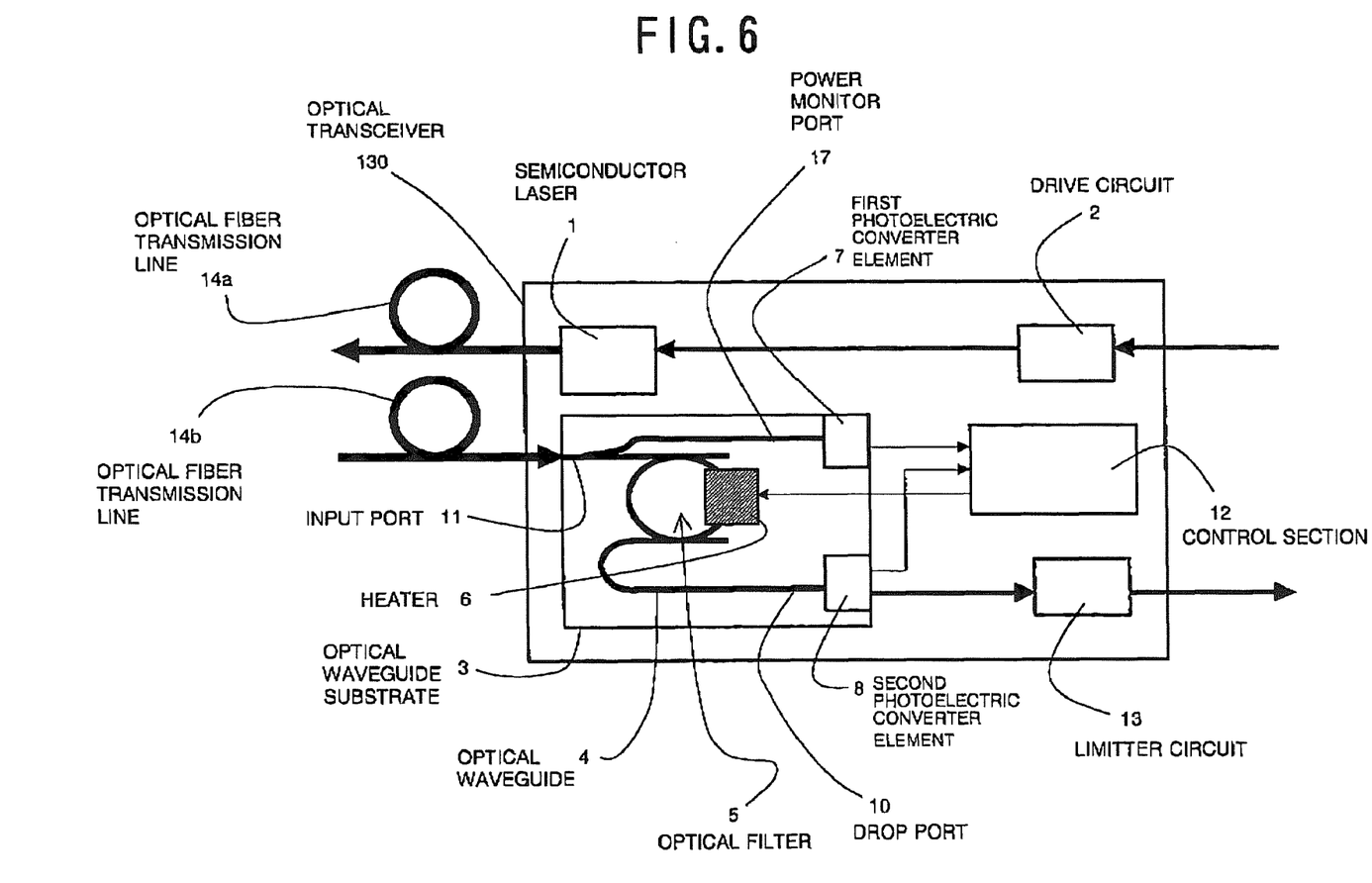
FIG. 6 is a functional block diagram showing the structure of an optical transceiver according to a fourth embodiment of the present invention.

FIG. 6 is a functional block diagram showing the structure of an optical transceiver 130 according to a fourth embodiment of the invention.

The optical transceiver 130 is the same in structure as the optical transceiver 100 according to the first embodiment of FIG. 1 except that a power monitor port 17 is provided instead of the through port 9 formed on the optical waveguide substrate 3. The power monitor port 17 is branched from the waveguide 4 at a position before the input position at which the frequency-modulated signal light received is inputted into the filter 5. Therefore, the explanation about the same structure is omitted here by attaching the same reference numerals as those used in the first embodiment for simplification.

Figure 7:
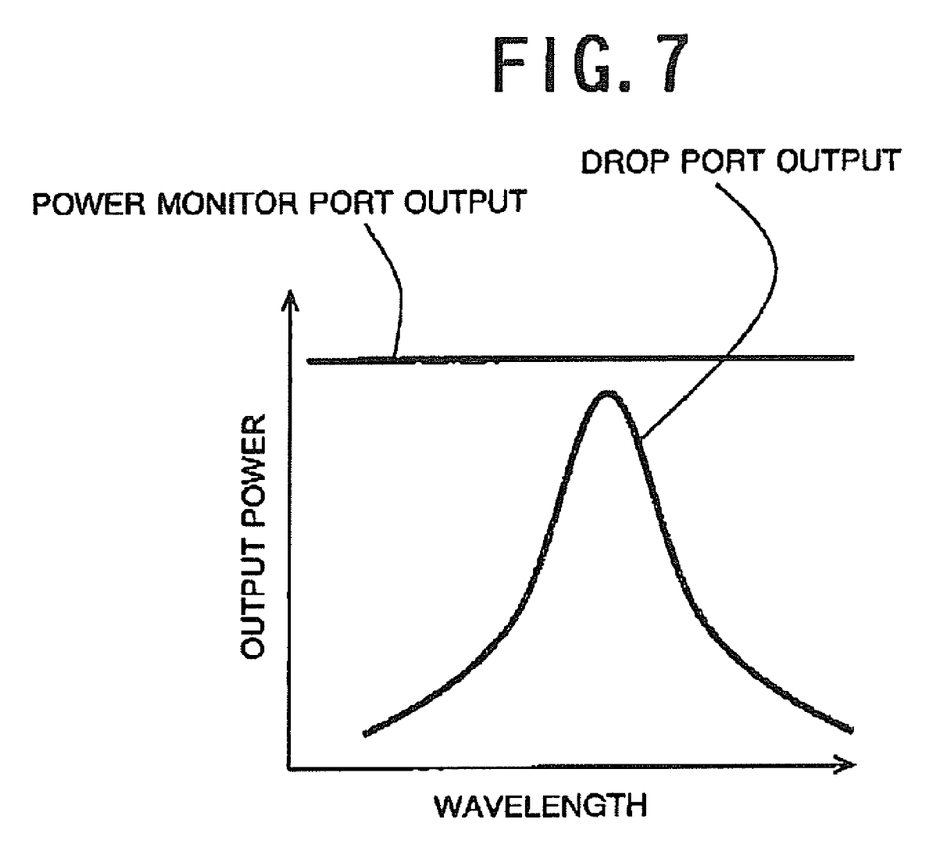
FIG. 7 is a graph showing the relationship between the characteristic of the intensity-modulated signal light inputted into the first photoelectric converter by way of the power monitor port and that of the intensity-modulated signal light inputted into the second photoelectric converter by way of the drop port in the optical transceiver according to the fourth embodiment of the present invention.

With the optical transceiver 130 according to the fourth embodiment, since the frequency-modulated signal light received is transmitted as it is to the power monitor port 17 without passing through the optical filter 5, the monitor characteristic shown in FIG. 7 is obtained. As apparent from FIG. 7, in the first photoelectric converter element 7 connected to the power monitor port 17, the output signal which does not dependent on the wavelength of the inputted signal light is obtained. So, it is sufficient that the value of (B/A) is simply used to obtain the value of $\Delta\lambda$, where A and B are monitor signals generated by the first and second photoelectric converter elements 7 and 8, respectively.

Other Embodiments

The above-described first to fourth embodiments are preferred examples of the present invention. Therefore, it is needless to say that the present invention is not limited to these embodiments. Any other modification is applicable to these embodiments.

For example, a ring oscillator filter is used as the optical filter in the above-described embodiments; however, any other type of optical filter may be used.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. An optical receiver for receiving a frequency-modulated signal light generated by frequency-modulating an input signal, the optical receiver comprising:

an optical filter for limiting the frequency-modulated signal light to a predetermined frequency band and for converting the frequency-modulated signal light to an intensity-modulated signal light;

the optical filter having a variable filtering wavelength;

an optical waveguide having an input port, a first output port, and a second output port;

the optical waveguide receiving the frequency-modulated signal light at the input port and transmitting the frequency-modulated signal light thus received toward the first output port and the second output port by way of the optical filter;

a first photoelectric converter, provided at the first output port of the optical waveguide, for converting the frequency-modulated signal light or a first component of the intensity-modulated signal light to an electric signal;

a second photoelectric converter, provided at the second output port of the optical waveguide, for converting a second component of the intensity-modulated signal light to an electric signal; and a controller for controlling the filtering wavelength of the optical filter based on the electric signal outputted from the first photoelectric converter and the electric signal outputted from the second photoelectric converter;

wherein the input signal is regenerated based on the electric signal outputted from the second photoelectric converter.

2. The optical receiver according to claim 1, wherein the first component is the intensity-modulated signal light whose frequency is outside the predetermined frequency band limited by the filter, and the second component is the intensity-modulated signal light whose frequency is in the predetermined frequency band limited by the filter.

3. The optical receiver according to claim 1, wherein the first component is the frequency-modulated signal light that does not pass through the optical filter, and the second component is the intensity-modulated signal light whose frequency is in the predetermined frequency band limited by the filter.

4. The optical receiver according to claim 1, further comprising a temperature adjuster for adjusting a temperature of the filter is additionally provided;
wherein the controller is configured in such a way as to control the filtering wavelength of the filter using the temperature adjuster.

5. The optical receiver according to claim 1, further comprising an optical amplifier provided in the waveguide.

6. The optical receiver according to claim 1, wherein the electric signal outputted from the first photoelectric converter and the electric signal outputted from the second photoelectric converter vary dependent on a difference $\Delta\lambda$ between a central frequency of the filter and a central frequency of the frequency-modulated signal light, respectively.

7. An optical transceiver comprising:
the optical receiver according to claim 1 as an optical reception section; and
an optical transmission section where the frequency-modulated signal light is generated and transmitted.

8. The optical transceiver according to claim 7, wherein the optical transmission section comprises a semiconductor laser; and
the frequency-modulated signal light is generated by direct-modulating the laser.

* * * * *